United States Patent
Ishikawa

(10) Patent No.: US 8,174,945 B2
(45) Date of Patent: May 8, 2012

(54) MULTI-LAYERED OPTICAL DISK AND OPTICAL DISK DEVICE CAPABLE OF ADDRESSING A FOCUS LEAD-IN OPERATION

(75) Inventor: Yoshinori Ishikawa, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 21 days.

(21) Appl. No.: 12/619,312

(22) Filed: Nov. 16, 2009

(65) Prior Publication Data
US 2010/0149937 A1    Jun. 17, 2010

(30) Foreign Application Priority Data

Dec. 15, 2008 (JP) .................................. 2008-317830

(51) Int. Cl.
*G11B 7/00* (2006.01)
(52) U.S. Cl. ..................... 369/52.1; 369/44.29
(58) Field of Classification Search .......................... None
See application file for complete search history.

(56) References Cited

U.S. PATENT DOCUMENTS

| | | | |
|---|---|---|---|
| 6,950,379 B2 * | 9/2005 | Yen et al. ....................... | 369/52.1 |
| 7,539,097 B2 * | 5/2009 | Ogura et al. .................. | 369/47.19 |
| 2002/0060968 A1 * | 5/2002 | Senshu ....................... | 369/59.25 |
| 2002/0097641 A1 * | 7/2002 | Kuze et al. .................... | 369/30.1 |
| 2002/0150031 A1 | 10/2002 | Katsuda | |
| 2005/0013225 A1 | 1/2005 | Ogasawara | |
| 2006/0271942 A1 | 11/2006 | Yamanaka | |
| 2007/0253306 A1 | 11/2007 | Takahashi et al. | |
| 2007/0263525 A1 | 11/2007 | Ohkubo | |
| 2007/0278307 A1 * | 12/2007 | Shimada et al. ......... | 235/462.13 |
| 2009/0046558 A1 * | 2/2009 | Ohkubo ........................ | 369/100 |
| 2009/0147645 A1 * | 6/2009 | Nakamura et al. .......... | 369/53.35 |
| 2010/0149937 A1 * | 6/2010 | Ishikawa .................... | 369/47.15 |
| 2010/0260026 A1 * | 10/2010 | Ishikawa et al. ................ | 369/94 |

FOREIGN PATENT DOCUMENTS

| | | |
|---|---|---|
| JP | 2002-313031 | 10/2002 |
| JP | 2004-152398 | 5/2004 |
| JP | 2006-338718 | 12/2006 |
| JP | 2007-066489 | 3/2007 |
| JP | 2007-109353 | 4/2007 |
| JP | 2007-305200 | 11/2007 |
| WO | WO 2006/038633 A1 | 4/2006 |

OTHER PUBLICATIONS

Ishikawa et al., WO 2008/143125 A1, published Nov. 27, 2008.*

* cited by examiner

*Primary Examiner* — Peter Vincent Agustin
(74) *Attorney, Agent, or Firm* — McDermott Will & Emery LLP

(57) ABSTRACT

There are provided a multi-layered optical disk and an optical disk device capable of swiftly reproducing control information recorded into a predetermined recording layer in advance. The object can be accomplished by employing the following configuration: When the optical disk device performs a focus lead-in operation into the multi-layered optical disk, the device positions its optical pickup at a BCA radius position, and takes advantage of a signal which is generated such that an influence exerted on the signal by BCA is avoided. Also, the object can be accomplished by employing the following configuration: An angle index unit for indicating a rotation reference position is provided in the multi-layered optical disk, and a partial area of the BCA is selected as an unrecording area. The optical disk device starts the focus lead-in operation in synchronization with rotation angle information created from the rotation reference position.

1 Claim, 12 Drawing Sheets

MULTI-LAYERED OPTICAL DISK AND OPTICAL DISK DEVICE CAPABLE OF ADDRESSING A FOCUS LEAD-IN OPERATION

INCORPORATION BY REFERENCE

The present application claims priority from Japanese Patent application JP2008-317830 filed on Dec. 15, 2008, the content of which is hereby incorporated by reference into this application.

BACKGROUND OF THE INVENTION

1. Field of the Invention

The present invention relates to a multi-layered optical disk including two or more recording layers, and an optical disk device capable of addressing a focus lead-in operation into the multi-layered optical disk.

2. Description of the Related Art

In recent years, the so-called multi-layered optical disks have been proposed for the purpose of enhancing recording capacities of optical disks. Here, each of these multi-layered optical disks is implemented by providing a plurality of recording layers within a piece of optical disk. An example of these multi-layered optical disks is a 100-GB multi-layered optical disk that is implemented by multilayering four recording layers each of which is a 25-GB recording layer.

A shortening of the set-up time is regarded as one of performances requested for an optical disk device for performing reproduction or recording of data with respect to these multi-layered optical disks. The set-up time refers to a time which elapses from a point-in-time when a user installs an optical disk into the optical disk device to a point-in-time when the user becomes capable of executing the reproduction or recording of data. The shorter this set-up time becomes, the higher the user convenience becomes.

In general, an optical disk device is requested to exhibit the downward compatibility which allows the optical disk device to address the CDs and DVDs, i.e., the conventional optical disks. In response to this request, the optical disk device performs a disk judgment processing for judging the type of an optical disk installed therein. The operation of the disk judgment processing is as follows: The installed optical disk is irradiated with a laser light. Moreover, a basic judgment operation for the disk type, i.e., CD, DVD, or BD, is performed, using the level of a reflected light from the optical disk. Incidentally, in this basic judgment operation, if the disk type has been successfully judged to be, e.g., BD, it is difficult to accurately distinguish among more detailed types such as BD-ROM, BD-R, and BD-RE. Even if the judgment on the more detailed types has been successfully made, there is a possibility of the false judgment. Accordingly, the optical disk device is required to perform the following operation: The optical disk device performs the focus lead-in operation into the installed optical disk. After that, the device reproduces control information recorded into the optical disk in advance. Furthermore, based on disk type information included in the control information reproduced, the device clarifies and confirms the type of the installed optical disk ultimately.

Also, the control information includes therein respective types of information for controlling the optical disk device. Example of the respective types of information are such information as polarity of a push-pull signal and polarity of a RF signal. The optical disk device is required to appropriately set respective types of circuits within the device in accordance with the above-described respective types of information.

From the foregoing explanation, implementation of the shortening of the set-up time requires that the control information recorded in the optical disk be reproduced swiftly. This requirement makes it desirable to swiftly perform the focus lead-in operation into a recording layer where the control information is recorded.

In, e.g., JP-A-2004-152398, the following multi-layered optical disk is disclosed for the purpose of performing the focus lead-in operation into a recording layer where the control information is recorded: Namely, in this optical disk, of a plurality of recording layers, a lead-in area is provided only in a predetermined recording layer. Simultaneously, at the radius position at which the lead-in area is disposed, the other recording layers possess no reflection layers. In the multi-layered optical disk disclosed in JP-A-2004-152398, as is the case with the conventional single-layered optical disks, it is possible to perform the focus lead-in operation at the radius position at which the lead-in area is provided. This condition allows the optical disk device to easily perform the focus lead-in operation into the recording layer where the lead-in area is provided, thereby making it possible to swiftly reproduce the control information recorded in the lead-in area.

Also, in general, when the recording layer of an optical disk becomes multi-layered, it becomes difficult to record the control information into a predetermined recording layer with a high accuracy. In JP-A-2007-66489, in order to solve this problem, the following multi-layered optical disk is disclosed: Namely, in this optical disk, of a first recording layer including a control-information recording area where the control information is recorded, and another recording layer, at least either of the recording film and the reflection film of another recording layer is formed in a manner of avoiding the control-information recording area. This configuration makes it possible to record the control information with a high accuracy.

SUMMARY OF THE INVENTION

In the above-described multi-layered optical disk disclosed in JP-A-2004-152398, the above-described control information is reproduced from the lead-in area. In the lead-in area, however, information other than the control information is recorded or reproduced in addition to the recording or reproduction of the control information as described above. For example, if, when recoding user data, the user data fails to be recorded due to a disk defect, the user data that could not be recorded is then recorded into the lead-in area. Moreover, at the time of the reproduction, the user data is reproduced from the lead-in area. Implementing the recording or reproduction of information in the lead-in area in this way requires the executing of a tracking servo operation and a seek operation. On account of this requirement, it is then required that such operations as the amplitude adjustment of a tracking error signal (which, hereinafter, will be referred to as "TE signal") be performed prior to the execution of the tracking servo operation and the seek operation.

The respective types of schemes, such as the publicly-known DPD method and push-pull method, have been proposed as generation schemes for the TE signal. It is commonly performed that the generation schemes for the TE signal are switched, depending on the disk types such as BD-ROM, BD-R, and BD-RE.

On account of this situation, when generating the TE signal by using, e.g., the DPD method first, if the installed optical disk is an unrecorded BD-R disk, no recording mark is not formed on the track. As a result, the TE signal cannot be generated normally, which makes it impossible to execute the tracking servo operation and the seek operation. On account of this situation, it is then required that the generation scheme for the TE signal be switched to another scheme, e.g., the push-pull method, and that such operations as the amplitude adjustment of the TE signal be performed once again. This extra processing becomes a cause for an increase in the set-up time.

From the above-described explanation, it is desirable that, before the tracking servo operation is performed, the control information can be reproduced in a state where only the focusing servo operation is operated.

Incidentally, concretely speaking, the above-described control information disclosed in JP-A-2007-66489 is recorded into a BCA (: Burst Cutting Area) area. If the focus lead-in operation can be performed in the BCA area, the control information becomes swiftly reproducible without performing the tracking servo operation. In the BCA area, however, there has existed the following problem: Namely, in the BCA area, a spike noise is caused to occur due to the BCA into a focus error signal (which, hereinafter, will be referred to as "FE signal"). This phenomenon makes it difficult to accurately perform the focus lead-in operation into the BCA area. In view of the above-described problems, an object of the present invention is to provide a multi-layered optical disk and an optical disk device which are capable of swiftly reproducing the control information on the multi-layered optical disk.

As an example, the object of the present invention can be accomplished by employing the following configuration: Namely, when the optical disk device performs the focus lead-in operation into the multi-layered optical disk, the optical disk device positions its optical pickup at the BCA radius position. Simultaneously, the device takes advantage of a signal which is generated in such a manner that the influence exerted on the signal by the BCA is avoided.

Also, the object of the present invention can be accomplished by employing the following configuration: Namely, an angle index unit for indicating a rotation reference position is provided in the multi-layered optical disk. Simultaneously, a partial area of the BCA is selected as an unrecording area. Moreover, the optical disk device starts the focus lead-in operation in synchronization with rotation angle information created from the rotation reference position.

According to the present invention, it becomes possible to provide the multi-layered optical disk and the optical disk device which are capable of swiftly reproducing the control information on the multi-layered optical disk.

Other objects, features and advantages of the invention will become apparent from the following description of the embodiments of the invention taken in conjunction with the accompanying drawings.

DESCRIPTION OF THE INVENTION

Hereinafter, the explanation will be given below concerning respective embodiments.

Embodiment 1

Hereinafter, the explanation will be given below regarding an optical disk device in a first embodiment of the present invention.

Figure 1:
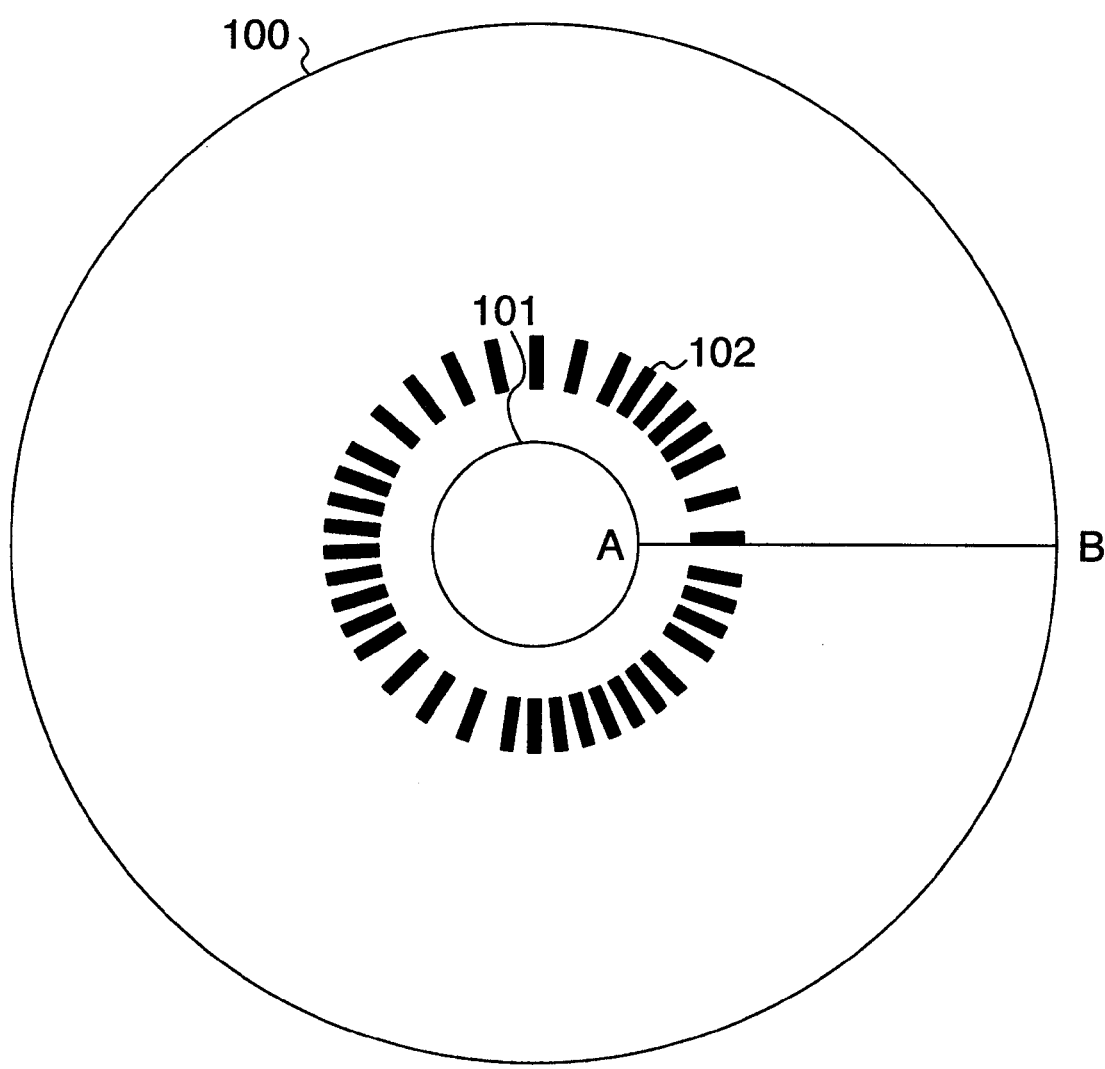
FIG. 1 is a schematic diagram of an optical disk.

FIG. 1 is a schematic diagram of a four-layered optical disk which is designed as the target of the focus lead-in operation performed by the optical disk device of the present invention. This diagram is the one seen from the incident-surface side of a laser light.

In FIG. 1, a center hole 101 for the disk installment is provided in the center of an optical disk 100. A BCA 102 is provided in the surroundings of the center hole 101. The BCA 102 is formed by burningly cutting a recording layer with a high-power laser light. In a state where the optical disk 100 is rotating, a focusing servo is executed at the radius position at which the BCA 102 is disposed. As a result of the execution of this focusing servo, the laser light is reflected at bright portions of the BCA 102, but is not reflected at dark portions of the BCA 102. On account of this phenomenon, the reflected-light level from the optical disk 100 becomes barcode data where its high level and its low level are repeated alternately. This barcode data is the BCA code which includes the control information therein.

Figure 2:
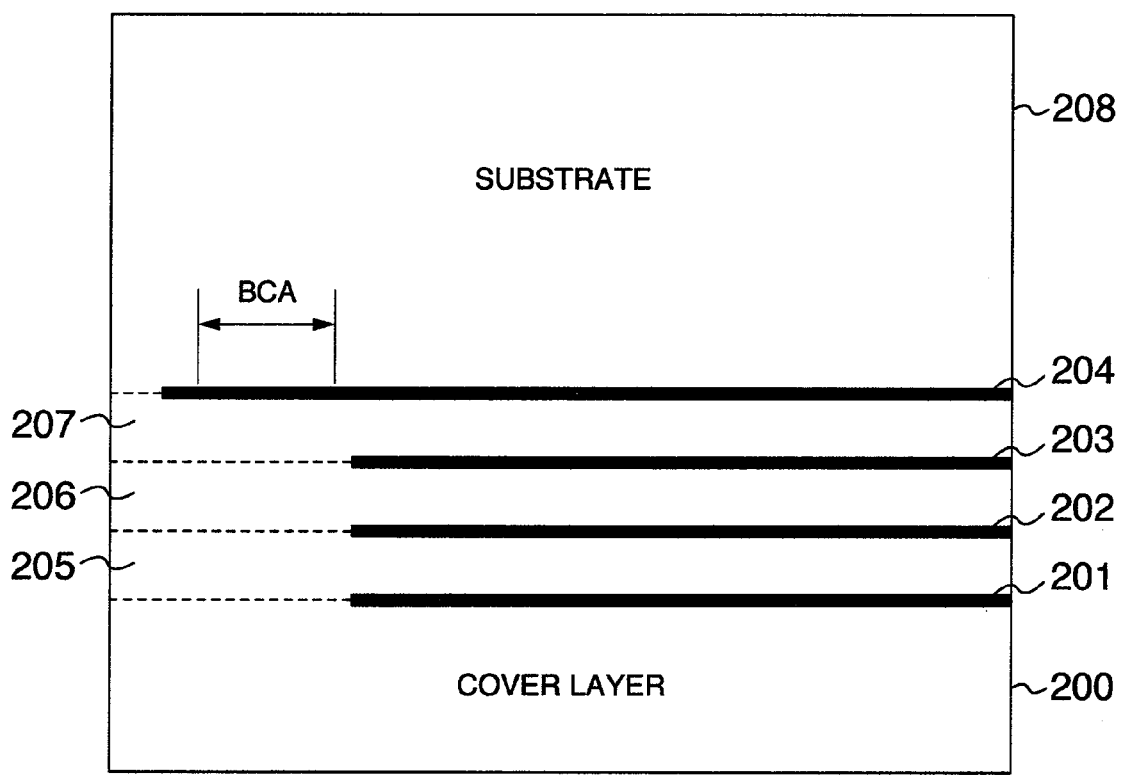
FIG. 2 is a cross-sectional schematic diagram of a multi-layered optical disk.

FIG. 2 is a cross-sectional schematic diagram of the optical disk 100 in FIG. 1 along a line-segment AB. The left side of the diagram is an inner-circumference side of the optical disk, and the right side of the diagram is an outer-circumference side of the optical disk.

A reference numeral 200 denotes a cover layer, which is composed of a substance such as transparent resin.

Reference numerals 201 to 204 denote recording layers L3, L2, L1, and L0, respectively. Incidentally, each recording layer possesses a multi-layered structure where a recording film and a reflection film composed of phase-change material or organic material are multi layered.

Reference numerals 205 to 207 denote space layers. Each space layer is composed of a transparent resin.

A reference numeral 208 denotes a substrate, which is composed of a substance such as polycarbonate.

Incidentally, it is desirable that thickness of the entire optical disk, where all the components from the cover layer 200 to the substrate 208 are combined with each other, is equal to 1.2 mm from the viewpoint of compatibility for the optical disk devices. For this thickness of 1.2 mm is equal to the thickness of the CDs, DVDs, and BDs, i.e., the conventional optical disks. Also, the laser light for performing the recording/reproduction of information is made incident and launched from the side of the cover layer 200. Moreover, the portions denoted by the dotted lines in FIG. 2 indicate each boundary among the cover layer 200, the respective space layers 205 to 207, and the substrate 208. It is assumed that, in each boundary, each recording layer possesses a structure which does not at least either of the recording film and the reflection film. In the explanation hereinafter, the explanation will be given assuming that each recording layer possesses neither of the recording film and the reflection film, i.e., a structure where each recording layer itself is absent. Each boundary is, e.g., a thin film of a transparent adhesive agent for binding the respective layers. It is assumed that the laser light for performing the recording/reproduction of data into/from the optical disk passes through each boundary almost completely.

The feature of the four-layered optical disk 100 illustrated in FIG. 2 is the following point: Namely, the recording layer L3 denoted by the reference numeral 204 possesses a structure that the recording layer L3 is made longer than the other recording layers in the inner-circumference direction, and that the BCA 102 is disposed at this longer portion. Here, consider the case where the optical disk 100 is irradiated with the laser light when performing the focusing servo lead-in at the radius position at which the BCA 102 is disposed. In this case, on account of the above-described structural configuration, it turns out that the laser light is reflected only from the recording layer L3. As a result, influences by the other recording layers will not be exerted on the laser light.

Incidentally, it is desirable that the width of the BCA area 102 illustrated in FIG. 2 is equal to 500 μm or more, considering a disk eccentric amount occurring when manufacturing optical disk 100, and a mechanical accuracy error in the optical disk device for performing the recording/reproduction into/from the optical disk 100.

Also, it is assumed that the specification of the optical disk in all the embodiments of the present invention is defined in its standard document, and that the radius position at which the BCA is disposed is also defined in its standard document.

Hereinafter, the explanation will be given below concerning the configuration and focus lead-in operation of the optical disk device of the present invention for performing the recording or reproduction of data with respect to the optical disk 100 explained in FIG. 1 and FIG. 2.

Figure 3:
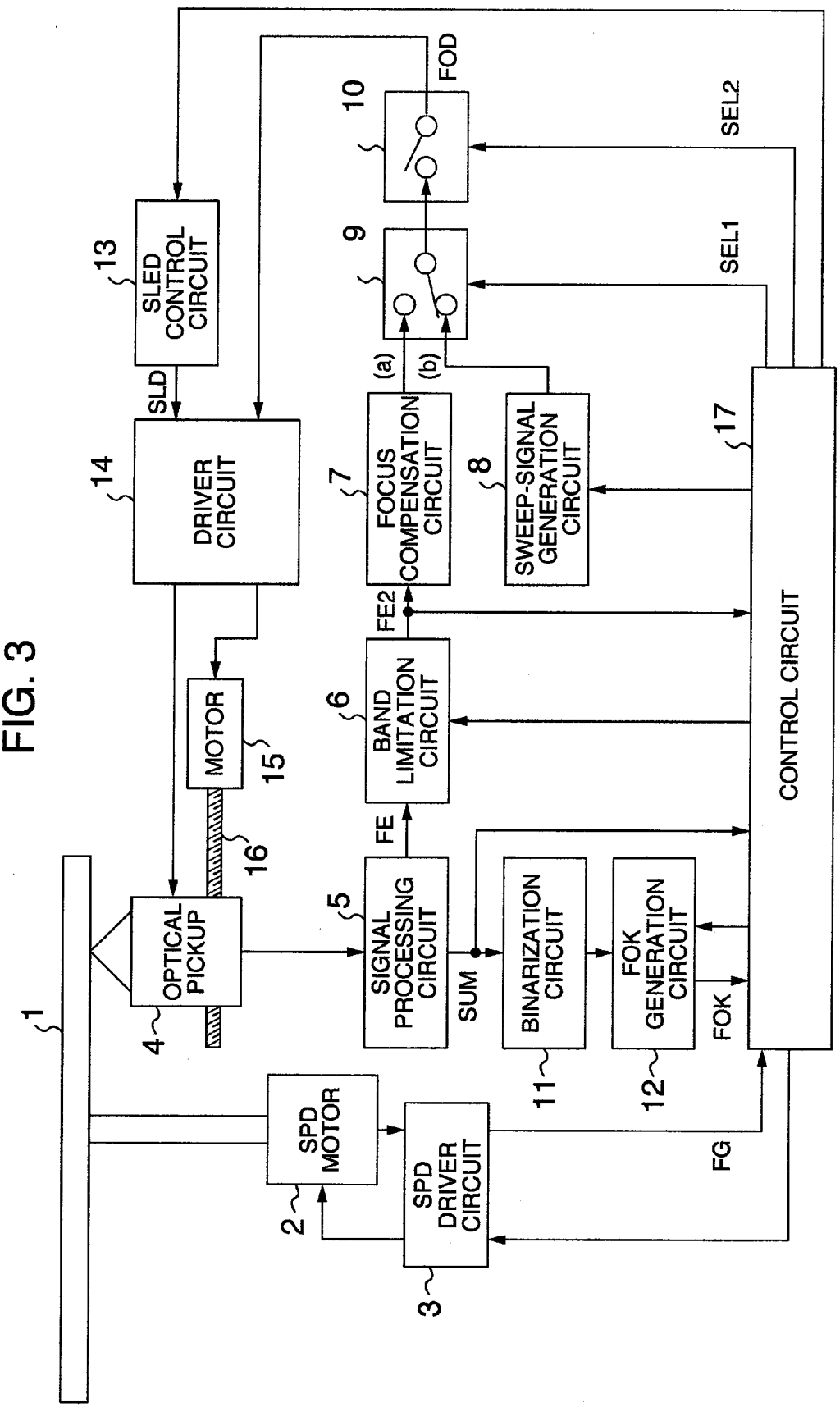
FIG. 3 is a schematic diagram for illustrating an optical disk device for explaining the present invention.

FIG. 3 is a schematic diagram for illustrating the configuration of the optical disk device in the first embodiment.

A reference numeral 1 denotes an optical disk, which is, e.g., the four-layered optical disk 100 illustrated in FIG. 1 and FIG. 2.

A reference numeral 2 denotes a spindle motor. The spindle motor 2 drives in accordance with an output signal from a spindle driver circuit 3, thereby rotating the optical disk 1. Also, the spindle motor 2 builds therein a hole sensor, thus outputting a hole-sensor signal which is synchronized with the rotation.

The reference numeral 3 denotes the spindle driver circuit. Based on a spindle driving signal outputted from a control circuit 17, the spindle driver circuit 3 outputs the driving signal for rotating the spindle motor 2. Also, based on the hole-sensor signal outputted from the spindle motor 2, the circuit 3 outputs the so-called FG signal which is synchronized with the rotation of the spindle motor 2. Incidentally, the FG signal is configured with a plurality of pulses which are emitted during a single rotation period of the optical disk 1.

A reference numeral 4 denotes an optical pickup, which is equipped with such optical components as a semiconductor laser and an objective lens. The optical pickup 4 irradiates the optical disk 1 with a laser light, thereby performing the recording/reproduction of information. Also, the optical pickup 4, which is equipped with a plurality of optical detectors, outputs electrical signals in correspondence with a reflected light from the optical disk 1. Moreover, the optical pickup 4 is equipped with a focus actuator and a tracking actuator, thereby being configured such that the optical pickup 4 is capable of driving the objective lens.

A reference numeral 5 denotes a signal processing circuit. The signal processing circuit 5 outputs a focus error signal (which, hereinafter, will be referred to as "FE signal") acquired by calculating the output signal from the optical pickup 4 using a publicly-known method such as astigmatic method, and a SUM signal acquired by adding the output signals from the plurality of optical detectors. Also, the signal processing circuit 5 outputs a tracking error signal ("TE signal") which is necessary for the tracking control (although the TE signal is not illustrated here, since it is not a configuration component of the present invention).

A reference numeral 6 denotes a band limitation circuit, which outputs a signal acquired by applying a predetermined band-limitation processing (in accordance with an instruction from the control circuit 17) to the FE signal outputted by the signal processing circuit 5. In the explanation hereinafter, the output from the band limitation circuit 6 will be referred to as "FE2 signal". Incidentally, the details of the band limitation circuit 6 will be described later.

A reference numeral 7 denotes a focus compensation circuit. The focus compensation circuit 7 outputs a signal acquired by applying a phase-and-gain compensation processing to the FE2 signal outputted by the band limitation circuit 6. This compensation processing is applied in order to improve the stability and following performance of the focusing servo operation.

A reference numeral 8 denotes a sweep-signal generation circuit. The sweep-signal generation circuit 8 generates and outputs a sweep signal for causing the objective lens installed in the optical pickup 4 to come nearer to or go away from the optical disk 1 in accordance with an instruction from the control circuit 17.

A reference numeral 9 denotes a switching circuit. The output signal from the focus compensation circuit 7 is inputted into the side of an input terminal (a), and the output signal from the sweep-signal generation circuit 8 is inputted into the side of an input terminal (b). Also, the switching circuit 9 is controlled by a control signal SEL1 supplied from the control circuit 17. If the control signal SEL1 is a Low output, the switching circuit 9 makes the switching onto the side of the input terminal (a). Meanwhile, if the control signal SEL1 is a High output, the switching circuit 9 makes the switching onto the side of the input terminal (b).

A reference numeral 10 denotes a switch, which performs an ON/OFF operation in accordance with a control signal SEL2 supplied from the control circuit 17. If the control signal SEL2 is a High output, the switch 10 turns into an ON state, thereby outputting the signal supplied from the switching circuit 9. Meanwhile, if the control signal SEL2 is a Low output, the switch 10 turns into an OFF state, thereby outputting a reference potential. At this time, the position of the objective lens in the focus direction becomes a middle-point position, and the focusing servo control is brought into an OFF state. Incidentally, the output signal from the switch 10 is a focus driving signal (which, hereinafter, will be referred to as "FOD signal").

A reference numeral 11 denotes a binarization circuit. The binarization circuit 11 outputs a digital signal acquired by binarizing the SUM signal at a predetermined level which is outputted from the signal processing circuit 5.

A reference numeral 12 denotes a FOK generation circuit, which outputs a signal acquired by applying a predetermined processing (in accordance with an instruction from the control circuit 17) to the digital signal outputted by the binarization circuit 11. In the explanation hereinafter, the output from the FOK generation circuit 12 will be referred to as "FOK signal". Incidentally, the details of the FOK generation circuit 12 will be described later.

A reference numeral 13 denotes a sled control circuit, which outputs a sled driving signal (which, hereinafter, will be referred to as "SLD signal") in response to an instruction from the control circuit 17.

A reference numeral 14 denotes a driver circuit. The driver circuit 14 supplies a signal, which is acquired by amplifying the FOD signal, to the focus actuator inside the optical pickup 4. Also, the driver circuit 14 supplies a signal, which is acquired by amplifying the SLD signal, to a sled motor 15.

A reference numeral 15 denotes the sled motor, which rotates in accordance with the signal acquired by amplifying the SLD signal in the driver circuit 14.

A reference numeral 16 denotes a lead screw. One end of the lead screw 16 is coupled to the sled motor 15, thereby being rotatably driven by the sled motor 15. Also, the optical pickup 4 is configured such that, if the lead screw 16 rotates, the optical pickup 4 is displaced to the radial direction of the optical disk 1.

A reference numeral 17 denotes the control circuit 17, which controls the entire optical disk device. The signals supplied to the control circuit 17 are the FE2 signal, the SUM signal, the FOK signal, and the FG signal. Also, the signals outputted from the control circuit 17 are the spindle driving signal, the control signal for controlling the sweep-signal generation circuit 8, the control signal SEL1 for controlling the switching circuit 9, the control signal SEL2 for controlling the switch 10, and the control signal for controlling the band limitation circuit 6. Incidentally, a general CPU is available in the control circuit 17.

Next, the explanation will be given below regarding the details of the band limitation circuit 6 and the details of the FOK generation circuit 12, respectively.

Figure 4:
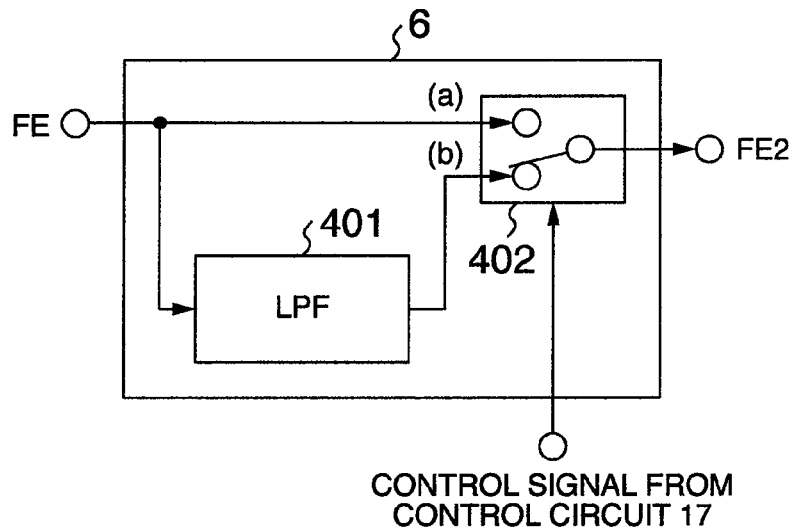
FIG. 4 is a schematic diagram for explaining a band limitation circuit included in the optical disk device of the present invention.

FIG. 4 is a schematic diagram for illustrating the configuration of the band limitation circuit 6.

A reference numeral 401 denotes a low pass filer (which, hereinafter, will be referred to as "LPF"), where a predetermined cut-off frequency is set. The purpose of the LPF 401 is the suppression over the BCA component included in the FE signal. A concrete numerical value of the cut-off frequency is set at, e.g., 30 kHz.

A reference numeral 402 denotes a switching circuit. The FE signal is supplied to the side of an input terminal (a), and the output signal from the LPF 401 is supplied to the side of an input terminal (b). Also, based on the control signal supplied from the control circuit 17, the switching circuit 402 switches to output the signal supplied to the input terminal (a) or the input terminal (b).

Figure 5:
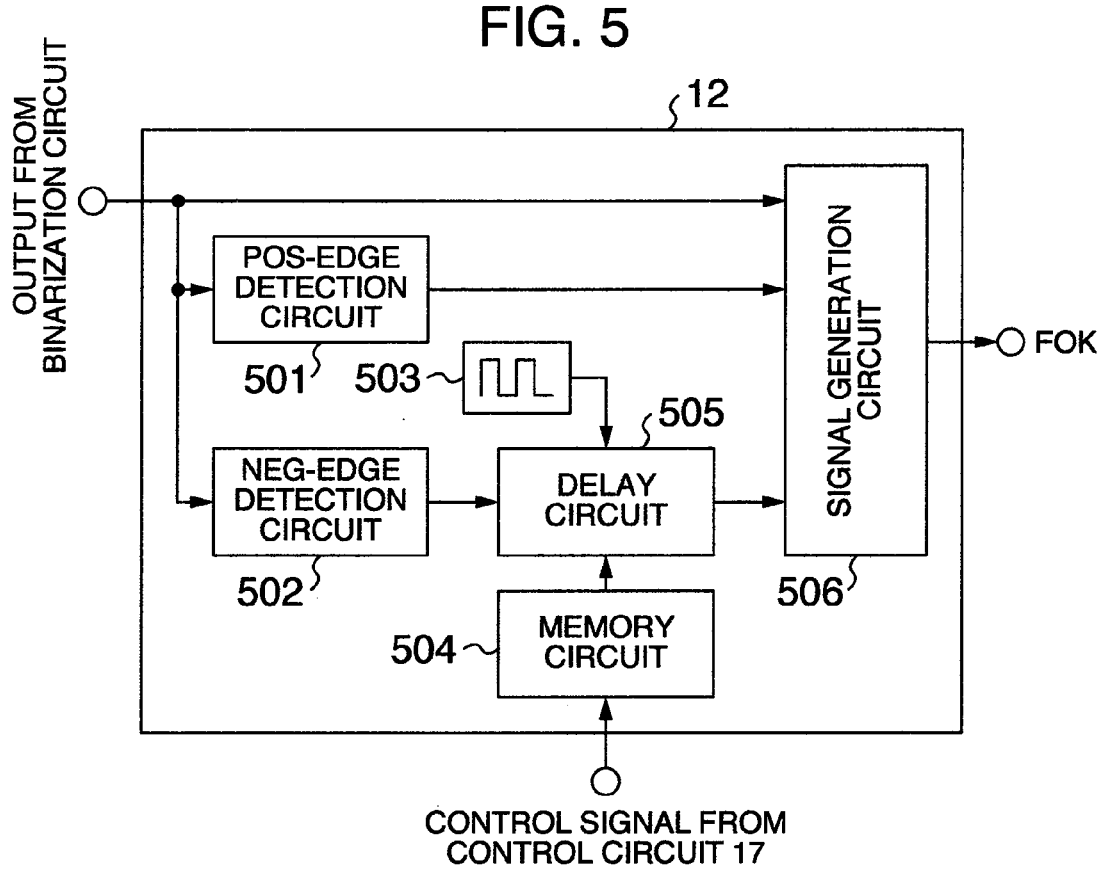
FIG. 5 is a schematic diagram for explaining a FOK generation circuit included in the optical disk device of the present invention.

FIG. 5 is a schematic diagram for illustrating the configuration of the FOK generation circuit 12.

A reference numeral 501 denotes a rising-edge detection circuit. When the rising-edge detection circuit 501 detects a rising edge of the output signal from the binarization circuit 11, the circuit 501 outputs a Hi-level pulse signal.

A reference numeral 502 denotes a falling-edge detection circuit. When the falling-edge detection circuit 502 detects a falling edge of the output signal from the binarization circuit 11, the circuit 502 outputs a Hi-level pulse signal.

A reference numeral 503 denotes a reference-clock generation circuit, which outputs a reference clock of a predetermined frequency.

A reference numeral 504 denotes a memory circuit, in which a set value for determining the operation of a delay circuit 505 is set based on a control signal from the control circuit 17.

A reference numeral 505 denotes the delay circuit. The delay circuit 505 outputs the output signal from the falling-edge detection circuit 502 in such a manner that the output signal is delayed in accordance with the reference clock and the set value set into the memory circuit 504. For example, if the frequency of the reference clock is equal to 10 MHz (i.e., the clock period=0.1 μs), and if the set value set into the memory circuit 504 is equal to 100, the delay circuit 505 delays the output from the falling-edge detection circuit 502 by the amount of 100 times the reference clock period, i.e., 10 μs.

A reference numeral 506 denotes a signal generation circuit. If the signal generation circuit 506 detects that the rising-edge detection circuit 501 has outputted the Hi-level pulse, the circuit 506 outputs a Hi-level signal. Meanwhile, if the signal generation circuit 506 detects that the delay circuit 505 has outputted a Hi-level pulse, the circuit 506 outputs a Low-level signal. If, however, the output signal from the binarization circuit 11 is a Hi-level signal when the delay circuit 505 has outputted the Hi-level pulse, the output level at the signal generation circuit 506 remains unchanged. Incidentally, the output from the signal generation circuit 506 is the FOK signal described earlier.

Figure 6:
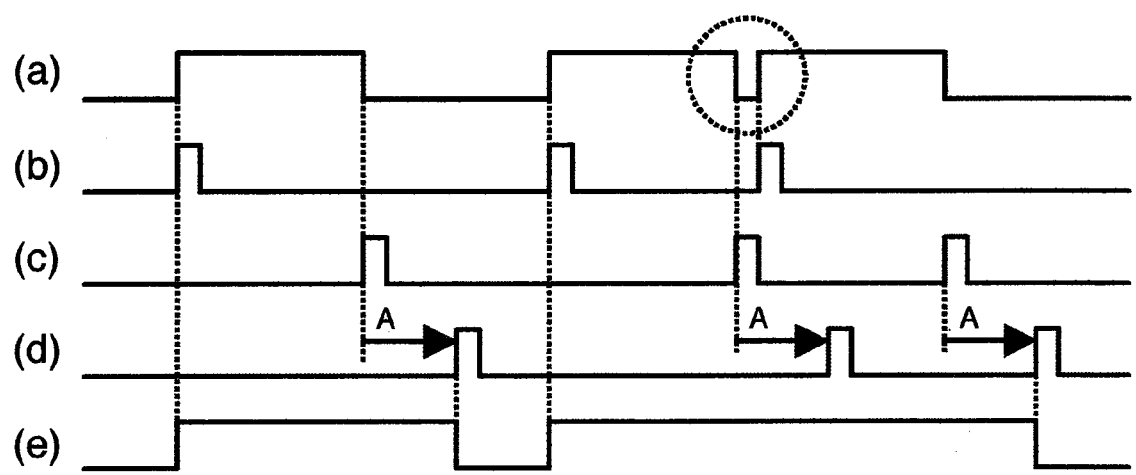
FIG. 6 is a waveform schematic diagram for explaining the FOK generation circuit included in the optical disk device of the present invention.

FIG. 6 is a waveform schematic diagram of each unit of the FOK generation circuit 12.

FIG. 6 (*a*) illustrates the output waveform of the binarization circuit 11, which is a Hi-level/Low-level digital signal. Incidentally, the portion surrounded by the circle in the FIG. 6 (*a*) has become a Low-level pulse, since the reflected-light level becomes lower in the BCA area.

FIG. 6 (*b*) illustrates the output waveform of the rising-edge detection circuit 501. This output waveform becomes the Hi-level pulse at each rising edge of the binarization-circuit output waveform (a).

FIG. 6 (*c*) illustrates the output waveform of the falling-edge detection circuit 502. This output waveform becomes the Hi-level pulse at each falling-edge of the binarization-circuit output waveform (a).

FIG. 6 (*d*) illustrates the output waveform of the delay circuit 505. This output waveform becomes the signal resulting from delaying the falling-edge-detection-circuit output waveform (c) by the amount of a predetermined time A.

FIG. 6 (*e*) illustrates the FOK-signal waveform outputted by the signal generation circuit 506. The FOK-signal waveform becomes a Hi-level pulse when the rising-edge-detection-circuit output waveform (b) becomes the Hi-level pulse. Also, the FOK-signal waveform becomes a Low-level pulse when the delay-circuit output waveform (d) becomes the Hi-level pulse. Here, as the condition under which the FOK signal becomes the Low-level pulse, the binarization-circuit output waveform (a) needs to be the Low-level pulse. As a result, the Low-level pulse due to the BCA is masked which is surrounded by the circle in the binarization-circuit output waveform (a). Namely, by appropriately setting the delay amount to be set into the memory circuit 504, it becomes possible to generate the FOK signal (e) which does not undergo the influence by the BCA.

In the configuration described above, the respective types of methods have been proposed as the judgment method for judging the type of an optical disk installed into the optical disk device. It is allowable, however, to employ whatever method of these proposed methods.

For example, the control circuit 17 drives the sled motor 15, thereby positioning the optical pickup 4 at the disk radius position (e.g., user data area) which includes all the recording layers. After that, the control circuit 17 switches the switching circuit 402 onto the side of the input terminal (a). Then, the control circuit 17 drives the objective lens into the optical-axis direction of the laser light while performing the irradiation with the laser light. Moreover, the control circuit 17 counts the S-curve number of the FE2 signal and the peak number of the SUM signal at the time when the laser spot passes through the recording layer of the optical disk 1, or measures the amplitude values of the FE2 signal and the SUM signal. Finally, the control circuit 17 judges the type of the installed optical disk, using these counted numbers or amplitude values.

If, as a result of the above-described judgment, the installed optical disk is found to be a conventional CD or DVD, the control circuit 17 performs the conventional focus lead-in operation.

Meanwhile, if, as a result of the above-described judgment, the installed optical disk is found to be the optical disk of the present invention described earlier, the control circuit 17 performs the focus lead-in operation into the BCA area in accordance with an operation which will be described hereinafter.

Figure 7:
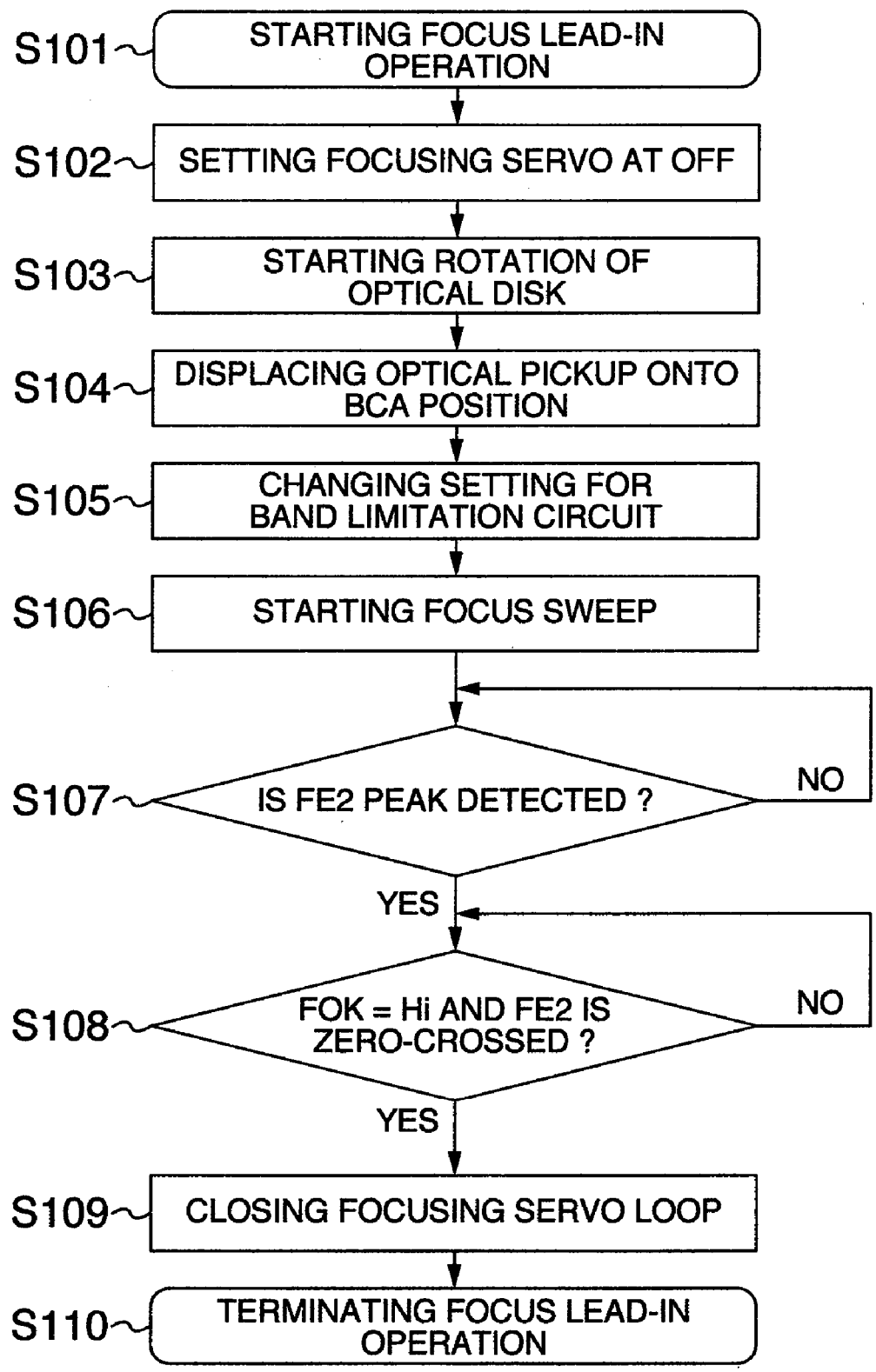
FIG. 7 is a flowchart for illustrating an embodiment of the present invention.

FIG. 7 is a flowchart for illustrating the focus lead-in operation in the first embodiment.

When the control circuit 17 starts the focus lead-in operation (step S101), the circuit 17 sets the control signal SEL2 at the Low output, thereby bringing the switch 10 into the OFF state. This operation brings the focusing servo control into the OFF state (step S102). Incidentally, if the focusing servo control has already been in the OFF state at the time of starting the focus lead-in operation, the above-described step S102 may be omitted.

Next, the control circuit 17 outputs a predetermined signal to the spindle driving signal, thereby starting to rotate the optical disk 1 (step S103), and rotating the optical disk 1 at a constant angular velocity.

Moreover, the control circuit 17 instructs the sled control circuit 13, thereby positioning the optical pickup 4 at the disk radius position at which the BCA is disposed (step S104). Since the disk radius position at which the BCA is disposed is defined in the standard of the optical disk, the circuit 17 performs the positioning in accordance with this standard.

Next, the control circuit 17 switches the switching circuit 402 inside the band limitation circuit 6 onto the side of the input terminal (b), thereby switching the setting for the band limitation circuit 6 (step S105).

Moreover, the control circuit 17 sets the control signal SEL1 at the Hi output, thereby switching the switching circuit 9 onto the side of the input terminal (b). Simultaneously, the circuit 17 sets the control signal SEL2 at the Hi output, thereby bringing the switch 10 into the ON state. Furthermore, the circuit 17 instructs the sweep-signal generation circuit 8, thereby causing the circuit 8 to output a predetermined sweep signal. On account of this, the sweep signal is outputted as the FOD signal via the switching circuit 9 and the switch 10, further being amplified by the driver circuit 14 and then being applied to the focus actuator inside the optical pickup 4. In this way, the control circuit 17 causes the objective lens to start the displacement in the optical-axis direction of the laser light, i.e., the focus sweep (step S106). This operation causes the objective lens to come nearer to the optical disk 1.

When the control circuit 17 has started the focus sweep, the circuit 17 monitors the FE2 signal, thereby detecting whether or not the FE2 signal has attained to its peak level (step S107). Concretely, it is assumed that the circuit 17 judges whether or not the FE2 signal has exceeded a predetermined level. It is also assumed that the predetermined level is set appropriately so that the peak level of the S-curve waveform of the FE2 signal will be able to be detected. If, at the step S107, the control circuit 17 judges that the FE2 signal has attained to the peak level (: Yes judgment), the circuit 17 terminates the step S107, then transferring to the next processing. Meanwhile, if, at the step S107, the circuit 17 judges that the FE2 signal has not attained to the peak level (: No judgment), the circuit 17 returns to the step S107, then continuing the monitoring of the FE2 signal.

If, at the step S107, the Yes judgment has been made, the control circuit 17 monitors the FOK-signal level and zero-cross of the FE2 signal (step S108). If, at the step S108, the control circuit 17 has detected the FOK=Hi and the zero-cross of the FE2 signal (: Yes judgment), the circuit 17 terminates the step S108, then transferring to the next processing. Meanwhile, if, at the step S108, the circuit 17 has not detected the FOK=Hi and the zero-cross of the FE2 signal (: No judgment), the circuit 17 returns to the step S108, then continuing the monitoring of the FOK signal and the FE2 signal.

If, at the step S108, the Yes judgment has been made, the control circuit 17 changes the control signal SEL1 into the Low output. This processing switches the switching circuit 9 onto the side of the input terminal (a), thereby closing the focusing servo loop (step S109).

If the control circuit 17 successfully accomplishes the lead-in of the focus servo on the basis of the above-described processing, the circuit 17 terminates the focus lead-in operation (step S110).

Incidentally, it is desirable that, assuming a case where the No judgment is repeated at the step S107 and the step S108, the time monitoring using a timer is performed within both steps, and a publicly-known error processing is executed if the timer values have exceeded a predetermined value.

Hereinafter, referring to a waveform schematic diagram illustrated in FIG. 8, the explanation will be given below concerning effects of the focus lead-in operation in the optical disk device of the present embodiment described above.

Figure 8:
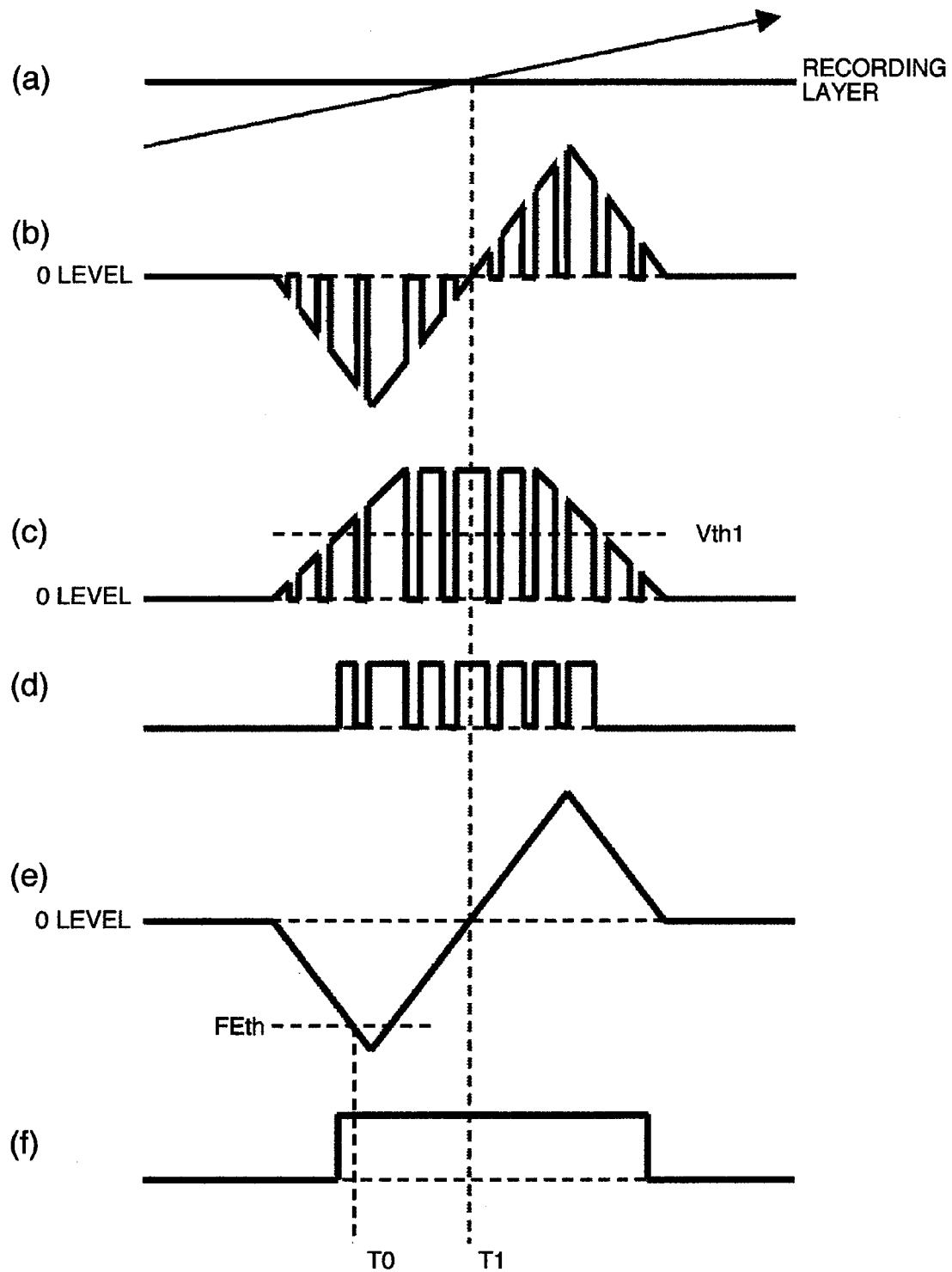
FIG. 8 is a waveform schematic diagram for explaining effects of the embodiment of the present invention.

FIG. 8 illustrates the waveform of each unit after the starting of the focus sweep (step S106) in the flowchart of the focus lead-in operation explained in FIG. 7.

FIG. 8 (a) illustrates a manner in which the laser spot passes through the recording layer of the optical disk 1. The arrow illustrated in the drawing is the trajectory of the laser spot. In the optical disk 1 into which the focus lead-in operation is performed, as illustrated in FIG. 2, the only one recording layer is present at the BCA position. Moreover, as explained at the step S104 in FIG. 7, the optical pickup 4 is positioned at the BCA position. As a result, the laser spot passes through only the recording layer in which the BCA is disposed.

FIG. 8 (b) illustrates the FE signal outputted by the signal processing circuit 5. At the time when the laser spot passes through the recording layer of the optical disk 1, the publicly-known S-curve waveform appears in the FE signal. The BCA, however, is disposed in the recording layer through which the laser spot passes. Here, the laser light is not reflected from the dark portions of the BCA. Accordingly, the optical-detector output built in the optical pickup 4 is dropped down at the zero level. On account of this dropping, the FE signal is also dropped down at the zero level in the dark portions of the BCA. As a result, this zero level appears as the spike-like noise in the S-curve waveform of the FE signal.

FIG. 8 (c) illustrates the SUM signal outputted by the signal processing circuit 5. When the laser spot comes nearer to the recording layer, its signal level becomes larger gradually. This signal level attains to its peak immediately before and after the laser spot passes through the recording layer. When the laser spot has passed through the recording layer, and displaces a little further, its signal level becomes smaller gradually, thus being dropped down at the zero level ultimately. Incidentally, because of a reason similar to that of the FE signal (b), the SUM signal (c) is also dropped down at the zero level in the dark portions of the BCA.

FIG. 8(d) illustrates the output signal waveform of the binarization circuit 11 (which, hereinafter, will be referred to as "binarization signal"). This binarization signal is the digital signal acquired by binarizing the SUM signal (c) with the use of a threshold-value level Vth1 illustrated in the drawing.

FIG. 8 (e) illustrates the FE2 signal outputted by the band limitation circuit 6. At the time of the focus lead-in operation, the switching circuit 402 illustrated in FIG. 4 has been switched onto the side of the input terminal (b). Accordingly, the spike-like noise in the S-curve waveform of the FE signal is eliminated by the LPF 401. As a consequence, the FE2 signal assumes the excellent S-curve waveform.

FIG. 8 (f) illustrates the FOK signal outputted by the FOK generation circuit 12. The spike-like noise in the BCA dark portions of the binarization signal (d) is eliminated by the operations explained in FIG. 5 and FIG. 6. As a consequence, the FOK signal assumes the excellent binarization signal.

In the state where the control circuit 17 monitors the FE2 signal at the step S107 illustrated in FIG. 7, the circuit 17 detects that the FE2 signal has exceeded a peak detection level FEth at a point-in-time T0 illustrated in FIG. 8. Furthermore, in the state where the control circuit 17 monitors the FE2 signal and the FOK signal at the step S108 illustrated in FIG. 7, the circuit 17 detects the zero-cross of the FE2 signal and that the FOK signal is the Hi-level at a point-in-time T1 illustrated in FIG. 8. Then, the control circuit 17 closes the focusing servo loop at the step S109 illustrated in FIG. 7.

As having been described above, the optical disk device of the first embodiment eliminates the influence by the BCA from the FE signal and the FOK signal, thereby making it possible to perform the precise lead-in of the focusing servo at the point-in-time T1 at which the laser spot is just focused on the recording layer.

Incidentally, in the case where the optical disk device of the first embodiment is not used, i.e., in the case of a conventional optical disk device, the control circuit 17 monitors the FE signal (b) and the binarization signal (d) illustrated in FIG. 8. Accordingly, the influence by the spike-like noise due to the BCA makes it highly likely that the conventional optical disk device will close the focusing servo loop with a timing earlier than the point-in-time T1 at which the laser spot is just focused on the recording layer. Consequently, it is obvious that there will occur a problem of being incapable of performing the focus lead-in operation normally.

Additionally, the optical disk device of the first embodiment is not limited to the configuration illustrated in FIG. 3 to FIG. 5. Instead, whatever configuration is allowable as long as it is a configuration which is capable of eliminating the spike-like noise due to the BCA from the FE signal and the FOK signal monitored by the control circuit 17 at the time of the focus lead-in operation.

As having been described above, when the optical disk device of the first embodiment performs the focus lead-in operation into the multi-layered optical disk, the device positions its optical pickup at the disk radius position at which the BCA is disposed. Simultaneously, the device is so configured as to be able to eliminate the spike-like noise due to the BCA from the FE signal and the FOK signal. The employment of this configuration allows the optical disk device to precisely perform the focus lead-in operation into the recording layer even if the just-focused position is the BCA area.

On account of this feature, it becomes possible to shorten the set-up time by reproducing the BCA data swiftly.

Embodiment 2

The optical disk device explained in the first embodiment is configured such that the optical disk device eliminates the spike-like noise due to the BCA from the FE signal and the FOK signal. In a second embodiment, however, the explanation will be given below regarding a multi-layered optical disk and an optical disk device which are capable of swiftly performing the focus lead-in operation into the BCA area even in a case where the spike-like noise due to the BCA cannot be eliminated from the FE signal.

The above-described case where the spike-like noise due to the BCA cannot be eliminated from the FE signal is, e.g., as follows: A case is where width of the dark portions of the BCA in the disk rotation-angle direction is wide, and where frequency of the spike-like noise due to the BCA becomes lower, thus coming closer to frequency of the S-curve waveform of the FE signal. Otherwise, a case is where, for convenience for optical design of the optical pickup, the time from a peak to the next peak of the S-curve waveform of the FE signal becomes shorter, i.e., the detection range for the focus error becomes narrower. A problem in these cases is as follows: If the cut-off frequency of the LPF 401 illustrated in FIG. 4 is set at a significantly low value in order that the spike-like noise due to the BCA will be able to be sufficiently eliminated from the FE signal, the S-curve waveform amplitude of the FE signal is lowered. Then, this lowering in the S-curve waveform amplitude results in the occurrence of a lowering in the focus lead-in operation capability.

Hereinafter, the explanation will be given below concerning a multi-layered optical disk and an optical disk device in the second embodiment of the present invention (each of which will be described in sequence).

(Optical Disk)

A cross-sectional diagram of the multi-layered optical disk in the present embodiment is the same as the one explained in the first embodiment and illustrated in FIG. 2.

Figure 9:
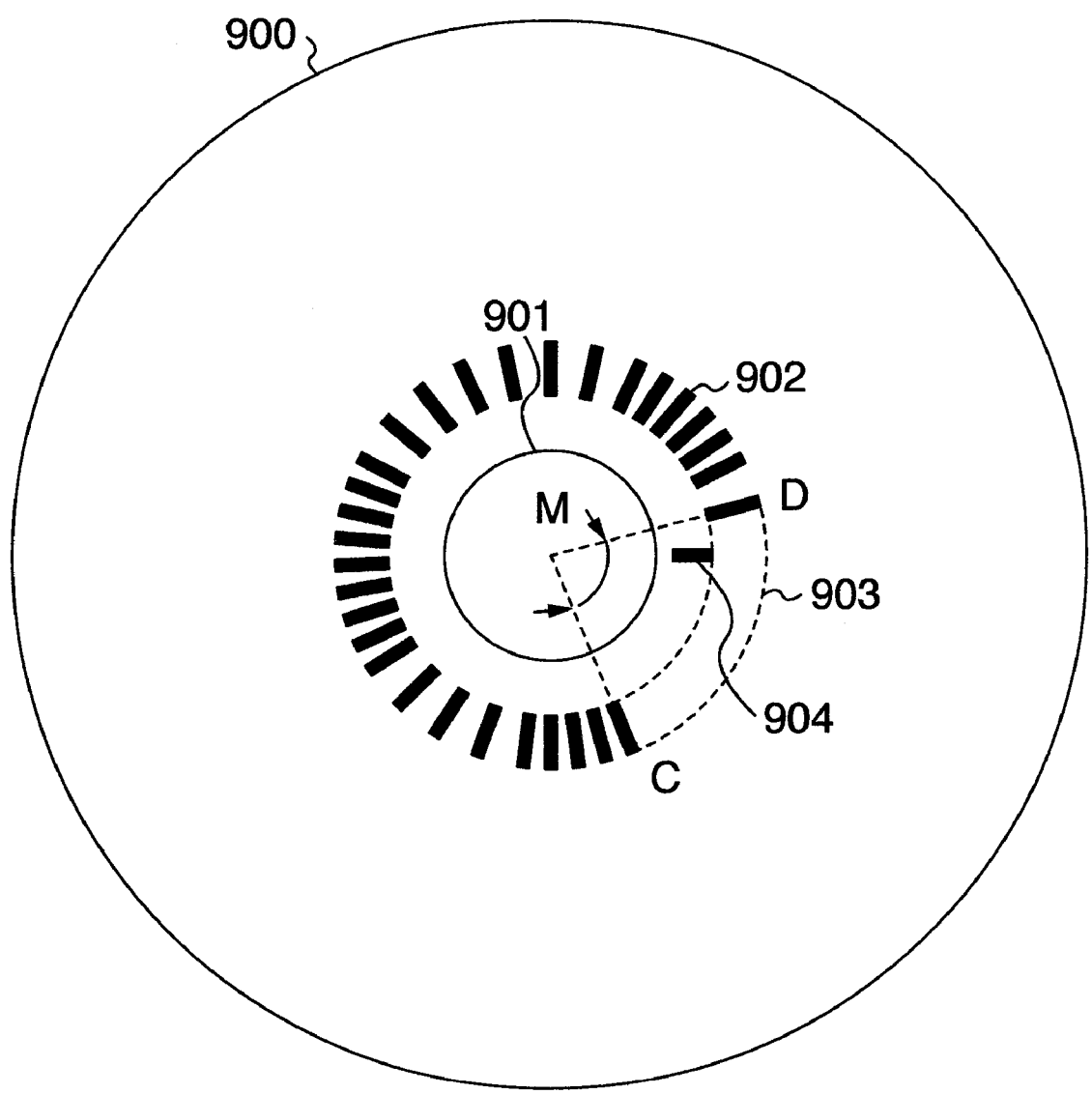
FIG. 9 is a schematic diagram of the optical disk for illustrating the embodiment of the present invention.

FIG. 9 is a schematic diagram of the optical disk of the present invention. This diagram is the one seen from the incident-surface side of a laser light. Additionally, it is assumed that the optical disk in the present embodiment is rotatably driven in the counterclockwise direction.

In FIG. 9, a center hole 901 for the disk installment is provided in the center of the optical disk 900. A BCA 902 is provided in the surroundings of the center hole 901. An unrecording area 903 is provided in a partial area of the BCA 902. Since the optical disk is rotated in the counterclockwise direction, the start position and the termination position of the BCA data are a C portion and a D portion illustrated in FIG. 9. It is assumed that the angle from the start position C to the termination position D of the BCA data, i.e., the angle of the unrecording area 903, is equal to a predetermined angle M or more.

Also, an angle index unit 904 for indicating a rotation reference position of the optical disk 900 is provided at the inner circumference of the BCA 902. It is assumed that the angle index unit 904 and the BCA-data start position C are in a predetermined phase relationship in terms of the rotation angle of the optical disk 900. Incidentally, as is the case with the BCA 902, the angle index unit 904 is also formed by burningly cutting the recording layer with a high-power laser light. On account of this, when the angle index unit 904 is irradiated with light, its reflected-light level becomes smaller as compared with reflected-light levels from portions other than the angle index unit 904. Additionally, it is assumed that the BCA 902 and the angle index unit 904 are formed in one and the same recording layer, which is, concretely, the L0 recording layer 204 illustrated in FIG. 2.

(Optical Disk Device)

Hereinafter, the explanation will be given below concerning the configuration and focus lead-in operation of an optical disk device for performing the recording or reproduction of data with respect to the optical disks having the structures illustrated in FIG. 2 and FIG. 9. Incidentally, the feature of the focus lead-in operation in the optical disk device in the second embodiment is the following point: The focusing servo loop is closed with a timing at which the laser spot is just focused on the unrecording area 903 of the BCA 902.

Figure 10:
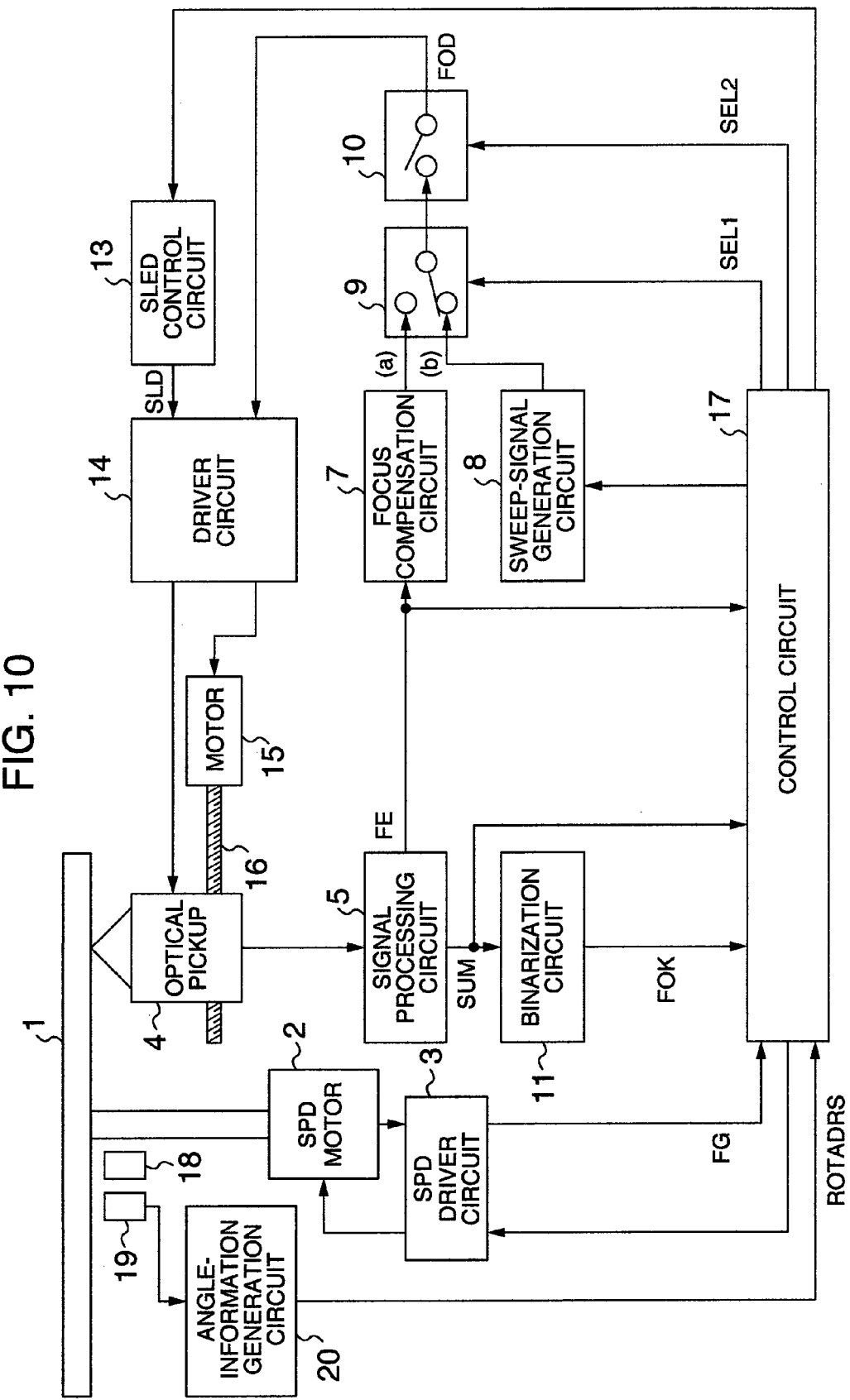
FIG. 10 is a schematic diagram for illustrating the optical disk device for explaining the present invention.

FIG. 10 is a schematic diagram for illustrating the configuration of the optical disk device in the second embodiment. The same reference numerals are affixed to the same configuration components as those in the first embodiment explained in FIG. 3. Accordingly, the explanation of the same configuration components will be omitted here.

The points in which the configuration in FIG. 10 differs from the configuration in FIG. 3 are as follows: The band limitation circuit 6 is omitted, and the FE signal is supplied to the focus compensation circuit 7 and the control circuit 17. The FOK generation circuit 12 is omitted, and the output from the binarization circuit 11 as the FOK signal is supplied to the control circuit 17. Moreover, the following configuration components are added:

A reference numeral 18 denotes a light-emitting diode, which emits, e.g., a red-color light. The light-emitting diode 18 is set up at a suitable position in the optical disk device so that the angle index unit 904 illustrated in FIG. 9 is irradiated with the light.

A reference numeral 19 denotes an optical detector. The optical detector 19 outputs an electrical signal in correspondence with the irradiation light emitted from the light-emitting diode 18 and reflected from the optical disk 1. Additionally, it is also allowable to employ the following configuration in order to permit the optical detector 19 to detect the reflected light from the optical disk 1 with a high accuracy: An optical element such as lens is provided between the light-emitting diode 18 and the optical disk 1, or between the optical detector 19 and the optical disk 1.

A reference numeral 20 denotes an angle-information generation circuit. The angle-information generation circuit 20 outputs a ROTADRS signal for indicating the absolute rotation angle of the optical disk 1 on the basis of the output signal from the optical detector 19. Next, referring to a configuration schematic diagram illustrated in FIG. 11 and a waveform schematic diagram illustrated in FIG. 12, the detailed explanation will be given below regarding the configuration of the angle-information generation circuit 20.

Figure 11:
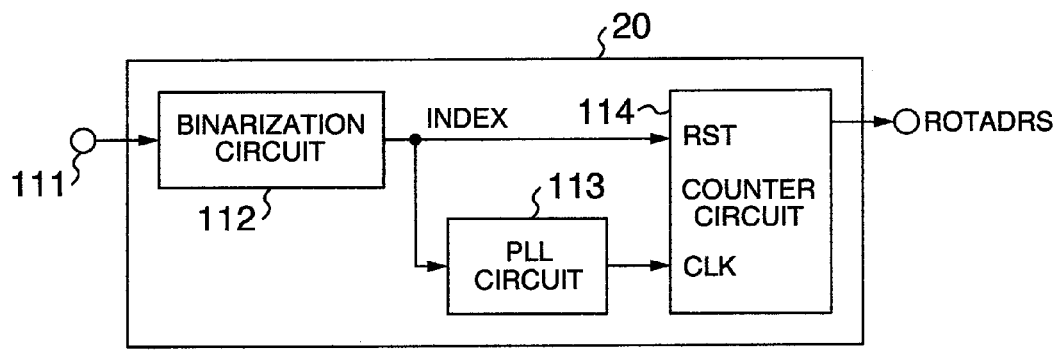
FIG. 11 is a schematic diagram for explaining an angle-information generation circuit included in the optical disk device of the present invention.

In FIG. 11, the angle-information generation circuit 20 includes a binarization circuit 112, a PLL circuit 113, and a counter circuit 114. Additionally, a reference numeral 111 illustrated in FIG. 11 denotes a signal input unit of the angle-information generation circuit 20. The output signal from the optical detector 19 is supplied to the signal input unit 111. Also, the output from the binarization circuit 112 and the output from the counter circuit 114 will be referred to as "INDEX signal" and "ROTADRS signal", respectively.

Figure 12:
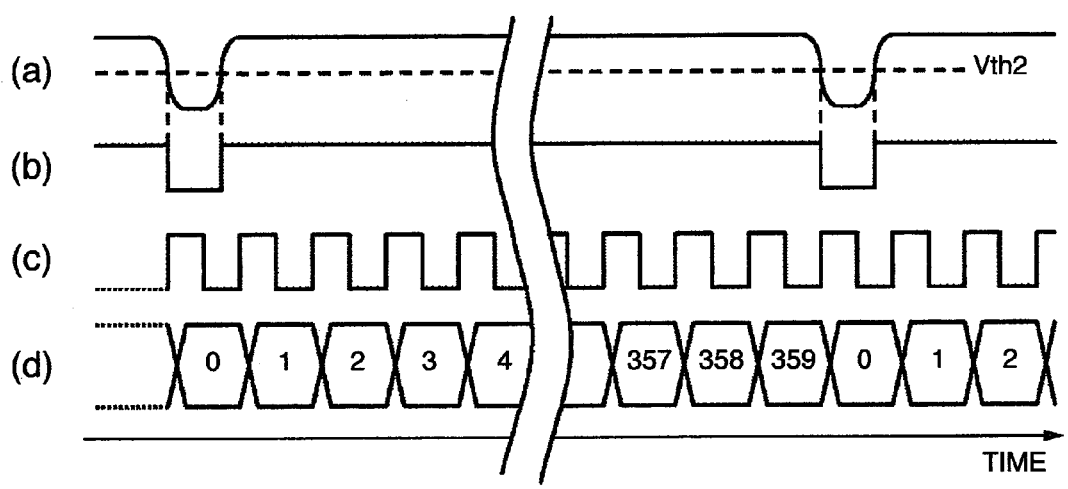
FIG. 12 is a waveform schematic diagram for explaining the angle-information generation circuit included in the optical disk device of the present invention.

FIG. 12 (a) illustrates the waveform of the optical-detector output signal supplied to the signal input unit 111. This waveform is shown when the optical disk 1 rotates. In the angle index unit 904, the reflected-light level becomes smaller. Accordingly, if the angle index unit 904 is detected, the signal level of the optical-detector output signal (a) becomes smaller.

FIG. 12 (b) illustrates the waveform of the INDEX signal. This INDEX signal is the signal acquired by binarizing the optical-detector output signal (a) with the use of a predetermined threshold-value level Vth2 illustrated in FIG. 12.

FIG. 12 (c) illustrates the output signal from the PLL circuit 113. The PLL circuit 113, which operates in synchronization with the INDEX signal (b), generates and outputs a plurality of clock signals. These clock signals are emitted during a time-period elapsing from the INDEX signal (b)'s outputting a Low-level pulse to the INDEX signal (b)'s outputting the next Low-level pulse, i.e., a single rotation time-period of the optical disk 1. In the present embodiment, it is assumed that the PLL circuit 113 generates the 360-emitted clock signals.

FIG. 12 (d) illustrates the ROTADRS signal which is outputted by the counter circuit 114, and is supplied to the control circuit 17 illustrated in FIG. 10. The counter circuit 114 counts up the clock signals in synchronization with the rising edge of the PLL-circuit output signal (c). If the INDEX signal (b) is dropped down at the Low level, the counted value is reset at zero. On account of this, the ROTADRS signal (d) outputted by the counter circuit 114 outputs the counted values from 0 to 359 repeatedly.

The angle index unit 904 passes through the irradiation light from the light-emitting diode 18 at only one time during the single rotation time-period of the optical disk 1. As a result, it turns out that, in synchronization with of the rotation of the optical disk 1, the INDEX signal (b) outputs the Low-level pulse at only one time during the single rotation time-period. Namely, it turns out that the INDEX signal (b)'s having outputted the Low-level pulse means that the angle index unit 904 has been detected. Here, since the value of the ROTADRS signal (d) becomes equal to zero at the angle index unit 904 illustrated in FIG. 9, the ROTADRS signal (d) indicates the absolute angle of the optical disk 1 on the basis of the angle index unit 904 as the reference.

Incidentally, from the configuration of the light-emitting diode 18 and the optical detector 19, the detection of the angle index unit 904 described above can be performed in the state where the focusing servo of the optical disk device is not operated.

In the configuration described above, as is the case with the first embodiment, the optical disk device judges the type of an optical disk installed therein. Then, if, as a result of the judgment, the installed optical disk is found to be the optical disk of the present invention, the control circuit 17 performs the focus lead-in operation at the radius position of the BCA 902 in accordance with a method which will be described hereinafter.

Figure 13:
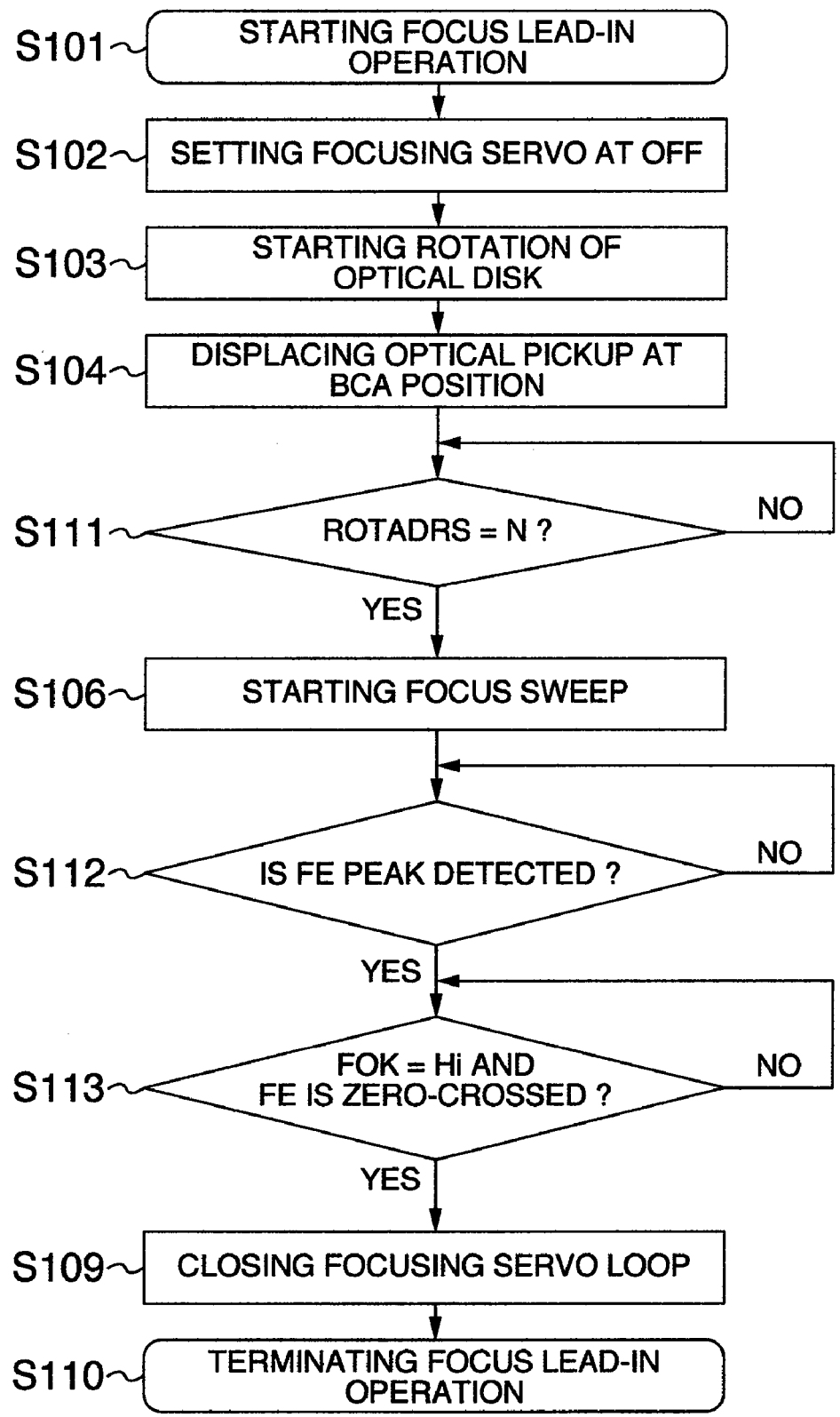
FIG. 13 is a flowchart for illustrating an embodiment of the present invention.

FIG. 13 is a flowchart for illustrating the focus lead-in operation in the second embodiment. Incidentally, the same reference numerals are affixed to the same configuration components as those of the flowchart in the first embodiment explained in FIG. 7. Accordingly, the explanation of the same configuration components will be omitted here.

The control circuit 17 operates in accordance with the flowchart illustrated in FIG. 13. The control circuit 17 executes the step S101 to the step s104, thereby positioning the optical pickup 4 at the disk radius position at which the BCA is disposed. After that, the circuit 17 monitors whether or not the value of the ROTADRS signal outputted by the angle-information generation circuit 20 is equal to a predetermined value N (step S111). The predetermined value N will be described later.

If, at the above-described step S111, the value of the ROTADRS signal is equal to the predetermined value N (: Yes judgment), the circuit 17 terminates the step S111, then transferring to the next processing. Meanwhile, if, at the step S111, the value of the ROTADRS signal is different from the predetermined value N (: No judgment), the circuit 17 returns to the step S111, then continuing the monitoring of the ROTADRS signal.

If, at the above-described step S111, the Yes judgment has been made, the control circuit 17 starts the focus sweep (step S106).

Moreover, the circuit 17 monitors the FE signal, thereby detecting whether or not the FE signal has attained to its peak level (step S112). The operation at the step S112 is basically the same as the one at the step S107 illustrated in FIG. 7. Namely, the FE2 signal of the monitoring target is changed to the FE signal merely.

If, at the above-described step S112, the Yes judgment has been made, the control circuit 17 monitors the FOK-signal level and zero-cross of the FE signal (step S113). The operation at the step S113 is basically the same as the one at the step S108 illustrated in FIG. 7. Namely, the FE2 signal of the monitoring target is changed to the FE signal merely.

If, at the above-described step S113, the Yes judgment has been made, the control circuit 17 closes the focusing servo loop (step S109), thereby terminating the focus lead-in operation (step S110).

The feature of the focus lead-in operation in the second embodiment described above is the following point: The focus sweep is started with a timing at which the ROTADRS value becomes equal to the predetermined value N. The ROTADRS value indicates the absolute angle of the optical disk. Consequently, appropriately setting the predetermined value N makes it possible to arbitrarily set the absolute rotation angle of the optical disk at which the focus sweep is to be started.

Hereinafter, referring to an operation-waveform schematic diagram illustrated in FIG. 14, the explanation will be given below concerning effects of the present embodiment.

Figure 14:
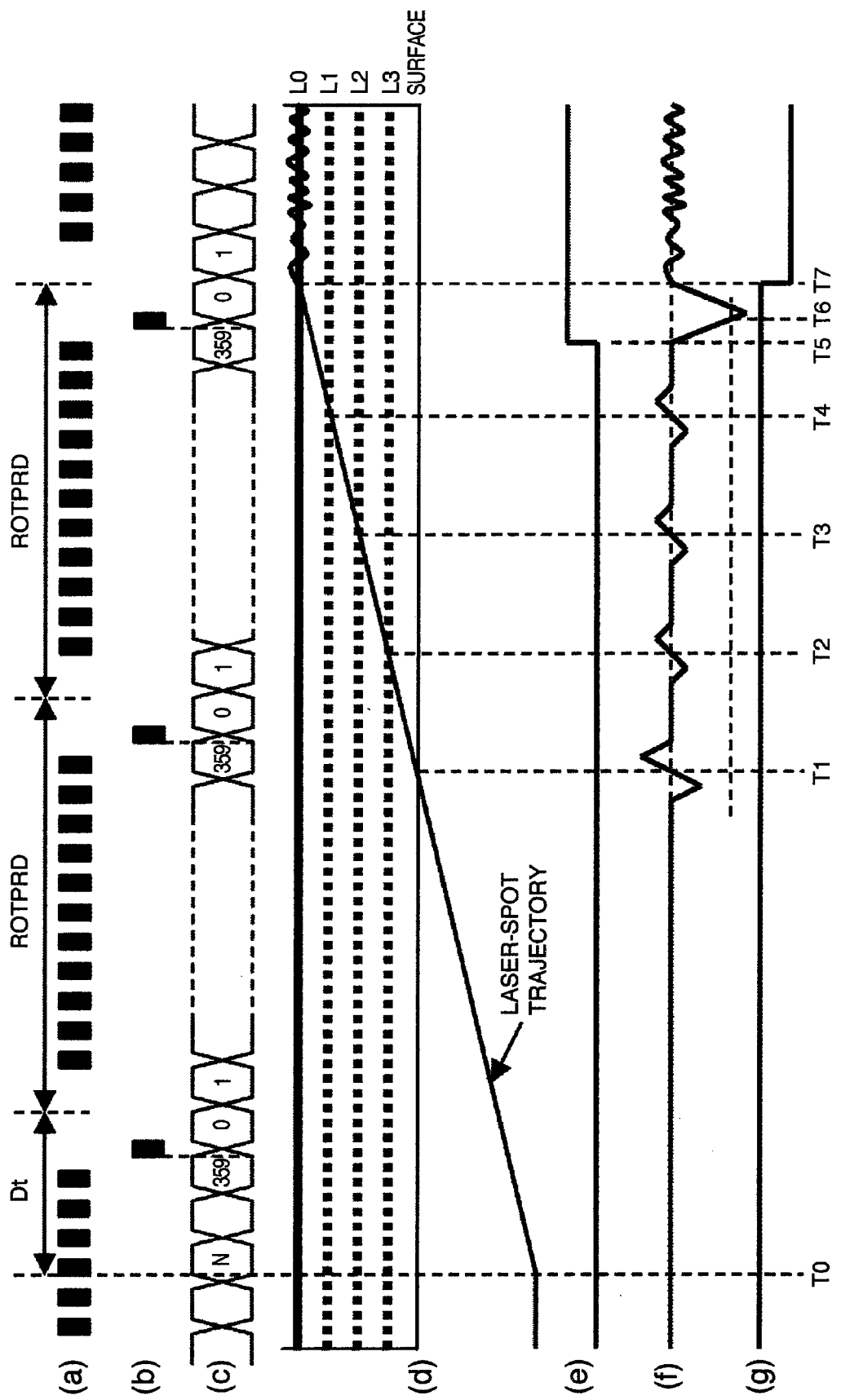
FIG. 14 is a waveform schematic diagram for explaining effects of the embodiment of the present invention.

FIG. 14 (a) is a diagram for schematically illustrating a manner of the BCA 902 in the state where the optical disk is rotating. The BCA 902 becomes the barcode pattern where its bright portion and its dark portion are repeated alternately in synchronization with the rotation of the optical disk. Also, the unrecording area 903 is provided in the BCA 902. On account of this, the BCA schematic diagram (a) becomes the bright portion in this unrecording area 903. Incidentally, the bright portion due to the unrecording area 903 appears at one time during the single rotation period of the optical disk.

FIG. 14 (b) is a diagram for schematically illustrating a manner of the angle index unit 904 similarly.

FIG. 14 (c) illustrates the ROTADRS signal outputted by the angle-information generation circuit 20.

FIG. 14 (d) illustrates a cross-sectional schematic diagram of the optical disk 1 and the laser-spot trajectory at the time of the focus lead-in operation. Incidentally, in the present embodiment, as illustrated in FIG. 2, the optical disk which performs the focus lead-in operation possesses the cross-sectional structure where the four recording layers are formed. At the time of the focus lead-in operation, however, the optical pickup 4 is displaced onto the BCA position in FIG. 2 at the step S104 illustrated in FIG. 13. As a result, at the time of the focus lead-in operation, the laser spot does not pass through the recording layers L1, L2, and L3, but passes through the transparent adhesive layers, i.e., the boundaries of the space layers 205 to 206. In view of this situation, in FIG. 14, the recording layer L0 is denoted by the solid line, and the transparent adhesive layers at the positions of the recording layers L1, L2, and L3 are denoted by the dotted lines.

FIG. 14 (e) illustrates the waveform of the FOK signal.

FIG. 14 (f) illustrates the waveform of the FE signal.

FIG. 14 (g) illustrates the waveform of the control signal SEL1. At the time of starting the focus lead-in operation, the focusing servo loop is opened by switching the switching circuit 9 onto the side of the input terminal (b). Accordingly, the control signal SEL1 (g) is raised up to the High level.

At a point-in-time T0 in FIG. 14, if the ROTADRS signal (c) becomes equal to the predetermined value N, the Yes judgment is made at the step S111 in FIG. 13, and the focus sweep is started. Moreover, as the objective lens included in the optical pickup 4 comes nearer to the optical disk in accordance with the focus sweep operation, the laser spot passes through the surface of the optical disk 1 at a point-in-time T1. At this time, since the laser light is reflected by the surface, the S-curve waveform appears in the FE signal (f). On the surface however, the reflectivity is smaller as compared with the recording layer, and thus the amplitude of the FE signal is small. On account of this, appropriately setting a peak detection level FEth of the FE signal makes it possible to prevent the detection of the S-curve waveform on the surface.

Furthermore, if the objective lens continues the focus sweep operation, at points-in-time T2, T3, and T4, the laser spot passes through the transparent adhesive layers denoted by the dotted lines. The optical refractive index differs between a transparent adhesive layer and a space layer adjacent thereto. Accordingly, the laser light is reflected slightly, and the signal level of the FE signal (f) is varied, but its variation amount is small. On account of this, the level of the FE signal (f) in proximity to the points-in-time T2, T3, and T4 will not exceed the peak detection level FEth.

After that, since the laser spot comes closer to the recording layer L0, the level of the SUM signal outputted by the signal processing circuit 5 becomes larger. On account of this, at a point-in-time T5, the FOK signal (e) is raised up to a High level.

Also, immediately before and after the timing at which the FOK signal (e) is raised up to the High level, the level of the FE signal (f) starts to change. Then, at a point-in-time T6, the level of the FE signal (f) exceeds the peak detection level FEth. On account of this, the Yes judgment is made at the step S112 in FIG. 13.

After that, at a point-in-time T7 in FIG. 14, the laser spot is just focused on the recording layer L0, and the FE signal (f) is zero-crossed. At this time, since the FOK signal (e) is maintained at the High level, the Yes judgment is made at the step S113 in FIG. 13. Accordingly, at the step S109 in FIG. 13, the Low level is outputted to the control signal SEL1 (g). This processing switches the switching circuit 9 onto the side of the input terminal (a), thereby closing the focusing servo loop.

In FIG. 14, the time elapsing from the focus-sweep start point-in-time T0 to the point-in-time T7 at which the laser spot has attained to the recording layer L0 is denoted by TIME1. Then, the time TIME1 is determined by the respective types of design values of the optical disk device, such as operation parameter of the sweep-signal generation circuit 8, focus actuator sensitivity, and distance from the optical disk 1 to the optical pickup 4. Also, the time elapsing from the focus-sweep start point-in-time T0 to the unrecording-area center occurring first in the BCA schematic diagram (a) is denoted by Dt. Moreover, the single rotation period of the optical disk 1 is denoted by ROTPRD, and the time elapsing from the focus-sweep start point-in-time T0 to the unrecording-area center in the BCA schematic diagram (a) is denoted by TIME2. Then, under these conditions, the time TIME2 is given by the following Expression:

$$TIME2 = Dt + m \times ROTPRD,$$

where m is an integer larger than 0.

Here, the focus-sweep start point-in-time T0 is the timing at which the ROTADRS signal (c) becomes equal to the predetermined value N. Consequently, adjusting the predetermined value N makes it possible to adjust the above-described time Dt. This fact makes it possible to adjust the above-described time TIME2 as well.

Accordingly, by adjusting the predetermined value N, and causing the time TIME2 to coincide with the time TIME1, it becomes possible to cause the point-in-time T7, at which the laser spot is just focused on the recording layer L0, to coincide with the unrecording area of the BCA (a). In the unrecording area of the BCA (a), the spike-like noise due to the dark portions of the BCA will not appear in the FE signal (f). As a result, the FE signal (f) assumes the excellent S-curve waveform. Consequently, it becomes possible to implement the precise lead-in of the focus.

Additionally, the actual optical disk devices are influenced by variations in the respective types of parameters (i.e., current sensitivity, main resonant frequency, and damping coefficient) of the focus actuator, and a surface-oscillation variation in the optical disk. Accordingly, it is expected that time TIME1 from T0 to T7 will vary for each optical disk device. On account of this, there arises a possibility that, when the laser spot is just focused on the recording layer L0, the focused area is found at area other than the unrecording area of the BCA (a). In order to avoid this problem, it is advisable to increase the angle M of the BCA unrecording area 903. For example, when the disk rotation frequency is equal to about 33 Hz, no problem will occur from the practical viewpoint if the angle M is equal to 60 degrees or more. Also, if, due to a failure of the BCA data amount, the angle M of the BCA unrecording area 903 has been found to be ensured only by 30 degrees, i.e., the one-half of the former example, it is advisable to set the disk rotation frequency down at 16.5 Hz, i.e., the one-half of the former disk rotation frequency 33 Hz. This processing leaves unchanged the time of the BCA unrecording area in FIG. 14. Consequently, as is the case with the above-described embodiment, it becomes possible to perform the precise focus lead-in operation.

Moreover, in some cases, the posture of an optical disk device being in use differs, such as depending on whether the mounting is vertical mounting or horizontal mounting. In this case, in the horizontal mounting, the objective lens sinks due to its own weight by gravity as compared with the vertical mounting. As a result, the distance from the objective lens to the optical-disk surface at the focus-sweep start point-in-time varies depending on whether the mounting is the vertical or horizontal one. On account of this, the time from the focus-sweep start point-in-time T0 to the just-focused point-in-time T7 varies depending on whether the mounting is the vertical or horizontal one. Accordingly, the timing at which the focus sweep is to be started, i.e., the predetermined value N, needs to be changed depending on whether the mounting is the vertical or horizontal one. On account of this, the following configuration is also employable, for example: The optical disk device judges the posture of the optical disk device using a sensor such as gyroscope, then changing the predetermined value N appropriately in accordance with the judgment result.

Incidentally, in the above-described embodiment, the description has been given such that the reflected-light level from the angle index unit 904 becomes smaller. A configuration is also employable where, conversely, the reflected-light level becomes larger. In this case, it is advisable that, in the angle-information generation circuit 20 illustrated in FIG. 11, a circuit for inverting the polarity of the INDEX signal is provided after the output from the binarization circuit 112.

Additionally, the angle index unit 904 is not limited to the shape illustrated in FIG. 9, i.e., some other shape is also allowable.

Furthermore, the following configuration is also employable, for example: A plurality of angle index units in different shapes are provided at a plurality of locations, thereby enhancing the response performance of the PLL circuit 113.

Also, in the above-described embodiment, the configuration has been employed where the angle index unit 904 is provided in the recording layer L0. A configuration, however, is also employable where the angle index unit 904 is provided on the surface of the optical disk by a printing or etching machining. Namely, most part of the irradiation laser light passes though the optical-disk surface, but the other part of it is reflected by the optical-disk surface. On account of this, by providing the angle index unit 904 so that a level difference will occur between this reflected light of the other part and the reflected light reflected by the angle index unit 904 provided on the optical-disk surface, it becomes possible to detect the angle index unit 904.

Examples of the detection method for the angle index unit 904 are not limited to the above-described example. Namely, whatever detection schemes are allowable as long as they are optical detection methods.

As the detection example for the angle index unit 904 described above, the description has been given regarding the case where the optical detection method is employed. A configuration, however, is also employable where some other method, e.g., a magnetic detection method, is employed. For example, a magnet is disposed at the inner circumference of the optical disk, and a magnetic sensor using a coil is provided instead of the light-emitting diode 18 and the optical detector 19 illustrated in FIG. 10. In this case, when the optical disk rotates, and the magnet provided in the optical disk passes though over the magnetic sensor, a change occurs in the electrical signal outputted from the magnetic sensor. Accordingly, it is advisable to detect this change.

Also, the PLL circuit 113 illustrated in FIG. 11 has been configured such that the PLL circuit 113 generates the 360-emitted clock signals during the single rotation time-period of the optical disk 1. This clock number, however, is not limited to the 360 emissions. Namely, some other setting, e.g., 180 emissions, is also allowable as long as the setting makes it possible to ensure the timing margin so that the focus lead-in operation can be performed into the unrecording area 903 of the BCA.

As having been described above, the multi-layered optical disk in the second embodiment has been configured as follows: The unrecording area is provided in the partial area of the BCA. Moreover, of the plurality of recording layers, at the radius position of the recording layer at which the BCA is disposed, the other recording layers are not provided. This configuration makes it possible to avoid the influences by the reflected lights from the other recording layers at the time of the focus lead-in operation. In addition thereto, there is provided the angle index unit for indicating the rotation reference position of the optical disk. This configuration allows the optical disk device to detect the rotation reference position of the optical disk.

Also, when performing the lead-in of the focus into the multi-layered optical disk, the optical disk device in the second embodiment displaces the optical pickup onto the disk radius position at which the BCA is disposed. Simultaneously, the optical disk device detects the angle index unit to create the absolute rotation angle information on the optical disk, then adjusting the focus-sweep start timing on the basis of the absolute rotation angle information. This adjustment allows the laser spot to be just focused on the unrecording area of the BCA at the time of the focus lead-in operation. This feature prevents the spike-like noise due to the BCA from occurring in the FE signal in proximity to the just-focused area. Consequently, it becomes possible to implement the correct lead-in of the focus at the BCA radius position of the recording layer. On account of this, it becomes possible to reproduce the BCA data swiftly, and thereby to shorten the set-up time.

Incidentally, the multi-layered optical disks in the embodiments have been configured such that, when the BCA is formed, the laser-cut portions are formed as the dark portions. Of the optical disks already made commercially-available, however, the so-called LTH (: Low To High)-type optical disks, where the reflectivity of the laser-cut portions increase, have also been made commercially-available. Consequently, it is also allowable that the multi-layered optical disks which the present invention regards as its targets are the LTH-type optical disks like this.

Also, the multi-layered optical disks in the embodiments have been configured such that the BCA is provided in the recording layer which is the deepest as viewed from the disk surface. A configuration, however, is also allowable where the BCA is provided in any of the other recording layers except for the most shallow recording layer as viewed from the disk surface.

Incidentally, the multi-layered optical disks explained in the embodiments have been the four-layered optical disks. The number of the recording layers, however, is not limited to four. Namely, the present invention is applicable to whatever multi-layered optical disks as long as they are the two layer or more multi-layered optical disks.

Furthermore, the optical system of the optical disk device which the present invention regards as its targets and the generation method for the servo error signal are not limited to the ones explained in the explanation in the embodiments. Namely, for example, the publicly-known knife edge method or the like is employable as the generation method for the FE signal, and the publicly-known DPD method or the like is employable as the generation method for the TE signal.

Also, as the focus lead-in operations explained in the embodiments, the description has been given concerning the focus lead-in operations which are executed first at the time of the disk installment. It is also allowable, however, to employ and execute the focus lead-in operations of the present invention when the lead-in of the focus is performed into a retry processing. Here, the retry processing refers to a processing which is executed when the focus servo is found to be out of the correct area by influences of some kind of outer disturbances such as vibration during the recording or reproduction.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. An optical disk device capable of reproducing information recorded in an optical disk including a Burst Cutting Area (BCA), said optical disk device, comprising:
   an objective lens for converging a laser light onto the optical disk;
   an actuator for driving the objective lens;
   a focus-error-signal generation circuit for generating a focus error signal using a reflected light from the optical disk; and
   a low pass filter for reducing a noise caused by the BCA, of the focus error signal; and
   a focus control circuit for controlling the actuator based on the focus error signal which passes through the low pass filter,
   wherein, when the actuator displaces the objective lens in an optical-axis direction of the laser light, a focus lead-in operation is performed at a BCA radius position by the focus control circuit based on the focus error signal which passes through the low pass filter.

* * * * *